US010161326B2

(12) United States Patent
Glugla et al.

(10) Patent No.: US 10,161,326 B2
(45) Date of Patent: Dec. 25, 2018

(54) METHODS AND SYSTEMS FOR CYLINDER MISFIRE DETECTION

(71) Applicant: Ford Global Technologies, LLC, Dearborn, MI (US)

(72) Inventors: Chris Paul Glugla, Macomb, MI (US); Robert Sarow Baskins, Grass Lake, MI (US); Jon Denis White, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 15/169,955

(22) Filed: Jun. 1, 2016

(65) Prior Publication Data

US 2017/0350333 A1    Dec. 7, 2017

(51) Int. Cl.
| | |
|---|---|
| *G01M 15/11* | (2006.01) |
| *F02D 41/00* | (2006.01) |
| *F02D 17/02* | (2006.01) |
| *F02D 35/00* | (2006.01) |
| *F02D 41/02* | (2006.01) |
| *F02D 41/26* | (2006.01) |

(Continued)

(52) U.S. Cl.
CPC ......... *F02D 41/0087* (2013.01); *F02D 17/02* (2013.01); *F02D 35/0015* (2013.01); *F02D 41/0215* (2013.01); *F02D 41/0295* (2013.01); *F02D 41/1446* (2013.01); *F02D 41/1454* (2013.01); *F02D 41/263* (2013.01); *G01M 15/11* (2013.01); *G01M 15/12* (2013.01); *F02D 41/1498* (2013.01); *F02D 2200/1012* (2013.01); *F02D 2200/1015* (2013.01)

(58) Field of Classification Search
CPC .................. G01M 15/11; G01M 15/12; F02D 2200/1015; F02D 41/1498; B60W 30/1498
See application file for complete search history.

(56) References Cited

U.S. PATENT DOCUMENTS 5,392,642 A * 2/1995 Tao ........................ G01M 15/12
                                                          73/114.13
5,559,285 A * 9/1996 Bryant ................. G01M 15/106
                                                          123/406.27

(Continued)

FOREIGN PATENT DOCUMENTS

| DE | 19922519 B4 * | 4/2010 | ........... F02D 41/221 |
| JP | 2005054601 A * | 3/2005 | ........... F02D 41/062 |

(Continued)

OTHER PUBLICATIONS

Chen, Jian. Randall, Robert B. Improved automated diagnosis of misfire in internal combustion engines based on simulation models. May 2015. Mechanical Systems and Signal Processing. Elsevier. vol. 64-65. pp. 58-63.*

*Primary Examiner* — Mahmoud Gimie
*Assistant Examiner* — Josh Campbell
(74) *Attorney, Agent, or Firm* — Julia Voutyras; McCoy Russell LLP (57) ABSTRACT

Methods and systems are provided for detecting cylinder misfire in a vehicle engine via a plurality of sensors, based on dual mass flywheel (DMF) operating frequency. In response to detection of a misfire event, the misfiring cylinders may be deactivated and upon confirmation of DMF operation out of a resonant frequency range, the deactivated cylinder(s) may be sequentially reactivated.

20 Claims, 6 Drawing Sheets

(51) Int. Cl.
    *G01M 15/12*     (2006.01)
    *F02D 41/14*     (2006.01)

(56) References Cited

U.S. PATENT DOCUMENTS

| | | | | |
|---|---|---|---|---|
| 5,609,547 | A * | 3/1997 | Matsushita | F16H 61/143 |
| | | | | 477/107 |
| 5,915,272 | A * | 6/1999 | Foley | G01M 15/046 |
| | | | | 701/110 |
| 6,098,013 | A * | 8/2000 | Mueller | F02D 41/1458 |
| | | | | 123/198 D |
| 6,763,807 | B1 * | 7/2004 | Gilles | F02D 17/02 |
| | | | | 123/198 F |
| 9,243,573 | B2 | 1/2016 | Glugla et al. | |
| 9,399,457 | B2 | 7/2016 | Gibson et al. | |
| 2005/0205371 | A1 * | 9/2005 | Nerubenko | F16F 15/133 |
| | | | | 188/291 |
| 2009/0076709 | A1 * | 3/2009 | Shiraishi | F02D 31/007 |
| | | | | 701/103 |
| 2012/0247414 | A1 * | 10/2012 | Crisp | F02N 11/0844 |
| | | | | 123/179.4 |
| 2014/0352659 | A1 * | 12/2014 | Glugla | F02D 41/0082 |
| | | | | 123/350 |
| 2016/0138500 | A1 | 5/2016 | Glugla et al. | |
| 2016/0146704 | A1 | 5/2016 | Ejakov | |

FOREIGN PATENT DOCUMENTS

| | | | | |
|---|---|---|---|---|
| JP | | 4017575 B2 * | 12/2007 | F02D 41/062 |
| JP | | 2016084709 A * | 5/2016 | |

\* cited by examiner

METHODS AND SYSTEMS FOR CYLINDER MISFIRE DETECTION

FIELD

The present description relates generally to methods and systems for detecting cylinder misfire in a vehicle engine and controlling engine operation in accordance.

BACKGROUND/SUMMARY

Individual engine cylinders may undergo a misfire event wherein a combustion event does not occur as intended. For engines with multiple cylinder banks, there may be conditions where every cylinder in a given bank misfires, resulting in a cylinder bank misfire. Engine control systems may include misfire detection modules for identifying such misfire events. As an example, engine misfire can be identified based on fluctuations in the crankshaft torsional vibration as detected by a crankshaft acceleration sensor.

However, the inventors herein have recognized potential issues with such detection methods that rely on a crankshaft acceleration sensor. By detecting misfire solely based on crankshaft acceleration sensor response, erroneous detection may take place. For example, in vehicles equipped with dual or variable mass flywheels (DMF) or pendulum dampers for reducing torsional vibrations in the vehicle, engine operations at certain speed levels may excite a resonant frequency in the DMF. This can result in crankshaft torsional vibrations that may be erroneously detected by the crankshaft acceleration sensor as a misfire event. As such, if an engine cylinder is deactivated in response to an indication of misfire, overall engine performance may be affected. Also, on-board diagnostic routines may be impacted by such inaccurate misfire indications.

The inventors herein have identified an approach by which the issues described above may be at least partly addressed. One example method for a boosted engine comprises: during dual mass flywheel (DMF) operation within a threshold range of a resonant frequency, indicating cylinder misfire based on each of a crankshaft torsional vibration, an exhaust air fuel ratio, and an exhaust gas temperature. In this way, by relying on a plurality of detection techniques selected based on operating conditions, cylinder misfire detection may be carried out more reliably even in the presence of DMF resonance.

As one example, an engine may be coupled to an automatic transmission via a dual mass flywheel, such as a pendulum damper. An engine misfire detection module of the engine may receive input from each of a crankshaft acceleration sensor, an exhaust gas oxygen sensor, and an exhaust gas temperature sensor. Upon detection of higher than threshold level of fluctuations in crankshaft torsional vibration based on a crankshaft acceleration sensor response, the controller may determine if the DMF is operating within a threshold resonant frequency range at the current vehicle speed. If it is determined that the DMF is operating within a threshold resonant frequency range, instead of indicating misfire in one or more cylinders based on only the crankshaft accelerator response, the misfire detection module may assess one or more additional parameters indicative of a misfire event to increase a confidence value of the misfire detection. For example, the controller may additionally monitor an air fuel ratio estimated by the exhaust gas oxygen sensor. If the air fuel ratio is higher than a threshold air-fuel ratio, optionally an exhaust gas temperature may also be monitored via the exhaust gas temperature sensor. If it is determined that the exhaust gas temperature is lower than a threshold temperature (while the air fuel ratio is higher than the threshold air-fuel ratio and fluctuations in crankshaft torsional vibration are higher than the threshold level), misfire detection may be confirmed, and one or more misfiring cylinders may be suitably deactivated. In still other examples, based on the presence of DMF vibration, the thresholds for each of the parameters may be updated. The deactivated cylinders may be selectively reactivated once it is confirmed that the DMF is no longer operating within the threshold resonant frequency range. If the DMF continues to operate within the threshold resonant frequency range even after a threshold period of time following cylinder deactivation, one or more engine actuators may be shifted to change engine speed such that the DMF operating frequency correspondingly changes. For example, a transmission gear may be downshifted, a torque converter slip schedule may be varied to decouple vibration input into transmission, etc. If upon cylinder reactivation, a misfire is detected again in an individual cylinder, then that cylinder may be selectively deactivated for a remainder of the engine operation with remaining cylinders in the bank being operated in an active state. Also, a flag may be set indicating the identity of the misfiring cylinder.

In this way, by relying on the output of a plurality of sensors including a crankshaft acceleration sensor, an exhaust gas oxygen sensor, and an exhaust gas temperature sensor for misfire detection, engine vibration due to misfire may be better distinguished from vibration resulting from DMF operation. The technical effect of relying on multiple parameters indicative of misfire during conditions of increased DMF vibration is that misfire detection accuracy is increased and engine cylinders may be held active for a longer duration. By reactivating cylinders upon confirmation of DMF operation out of a resonant frequency range, further erroneous misfire detection for the reactivated cylinders may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
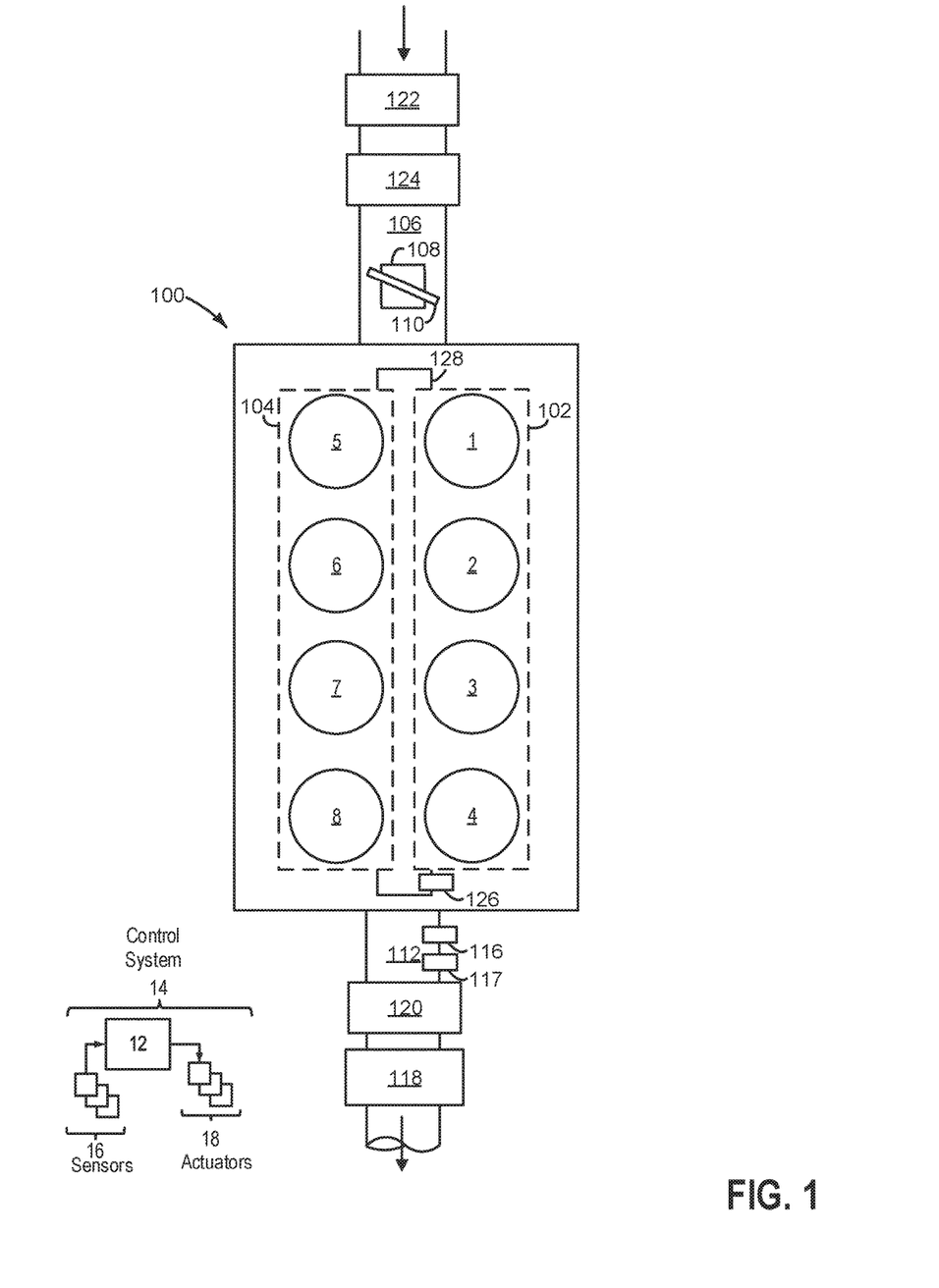
FIG. 1 shows an example embodiment of an engine system including two cylinder banks.
Figure 2:
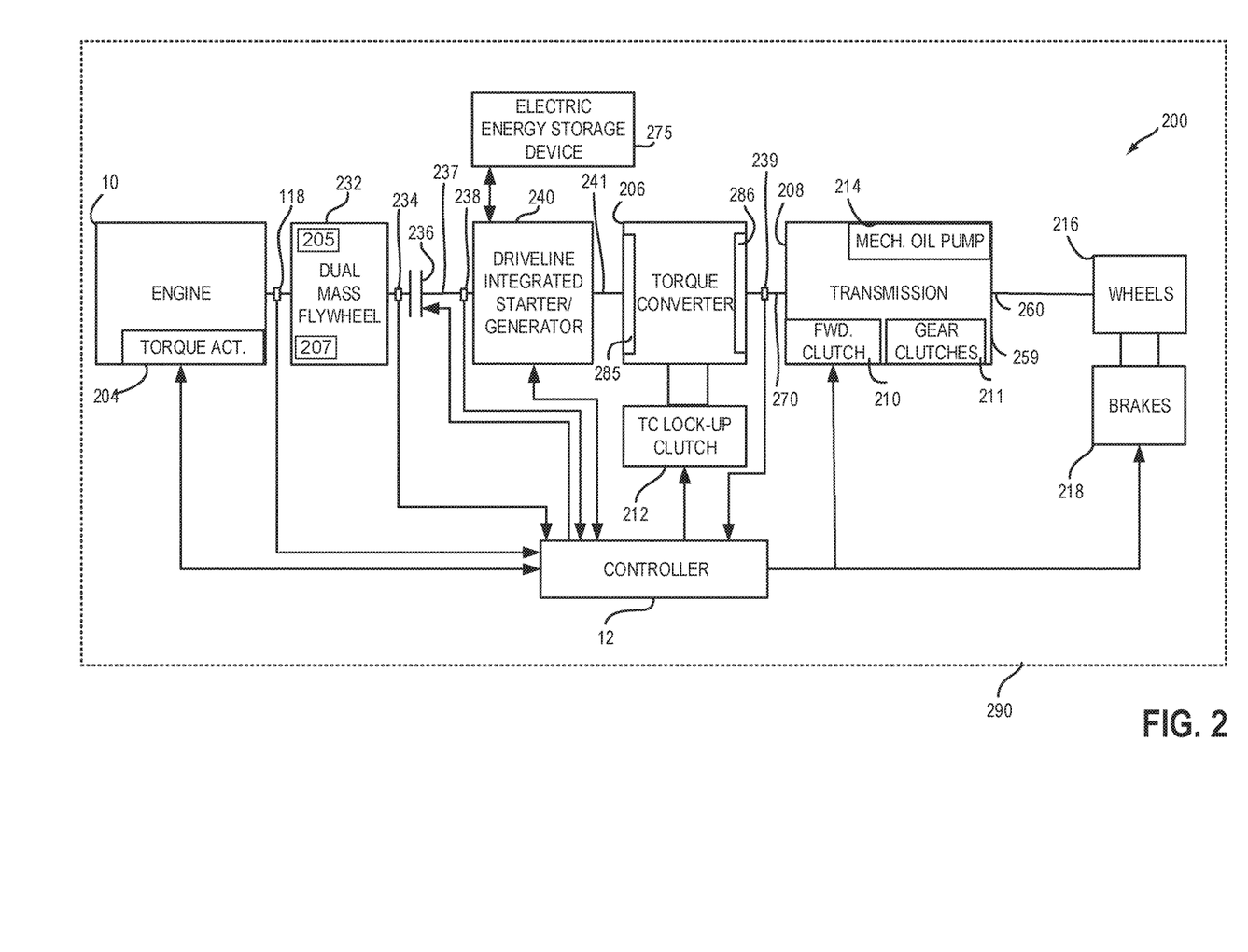
FIG. 2 shows an example vehicle driveline configuration.

The following description relates to systems and methods for reliable detection of cylinder misfire in a vehicle engine and corresponding adjustments to engine operations. An example engine system comprising two cylinder banks is shown in FIG. 1. An example vehicle system including an engine and a driveline integrated starter/generator (DISG) or electric machine (e.g., motor/generator) is shown in FIG. 2. An engine controller may be configured to perform control routines, such as the example routine of FIG. 3 to detect an engine misfire event based on a plurality of sensors, and the example routine of FIG. 4 to sequentially reactivate cylinders that were deactivated in response to detection of the misfire event. An example of misfire detection followed by cylinder deactivation and subsequent reactivation is shown in FIGS. 5A and 5B.

Referring now to FIG. 1, a schematic diagram showing a multi-cylinder engine 100, which may be included in a propulsion system of a vehicle, is illustrated. The engine 100 may be controlled at least partially by a control system 14 including a controller 12. The engine 100 may be a V-engine, and in this non-limiting example, a V-8 engine is illustrated with a first cylinder bank 102 (e.g., the right cylinder bank in FIG. 1) including four cylinders and a second cylinder bank 104 (e.g., the left cylinder bank in FIG. 1) including four cylinders. In other examples, the engine may have another number of cylinders, such as a V-6 engine, V-10 engine, or V-12 engine, for example. In the example of FIG. 1, the first cylinder bank 102 includes a first cylinder, a second cylinder, a third cylinder, and a fourth cylinder. The second cylinder bank 104 includes a fifth cylinder, a sixth cylinder, a seventh cylinder, and an eighth cylinder. The cylinders of the first cylinder bank 102 and the second cylinder bank 104 may receive intake air from an intake passage 106 and may exhaust combustion gases via an exhaust passage 112.

In one example, the engine 100 is a diesel engine that combusts air and diesel fuel through compression ignition. In other non-limiting embodiments, the engine 100 may combust a different fuel including gasoline, biodiesel, or an alcohol containing fuel blend (e.g., gasoline and ethanol or gasoline and methanol) through compression ignition and/or spark ignition.

The intake passage 106 may include a throttle 108 having a throttle plate 110. In this particular example, the position of the throttle plate 110 may be varied by the controller 12 via a signal provided to an electric motor or actuator included with the throttle 108, a configuration that is commonly referred to as electronic throttle control (ETC). In this manner, the throttle 108 may be operated to vary the intake air provided to the engine cylinders.

As depicted, an exhaust gas sensor 116 is coupled to the exhaust passage 112 upstream of an emission control device 118. The sensor 116 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Also, an exhaust gas temperature sensor 117 may be coupled to the exhaust passage. The emission control device 118 is shown arranged along the exhaust passage 112 downstream of the exhaust gas sensor 116. In the example shown in FIG. 1, the emission control device 118 may be an exhaust catalyst, such as a three way catalyst, for example. In other embodiments, the device 118 may additionally or alternatively include a particulate filter, NOx trap, selective catalytic reduction system, various other emission control devices, or combinations thereof. In some embodiments, during operation of the engine 100, the emission control device 118 may be periodically reset by operating at least one cylinder of the engine within a particular air/fuel ratio.

As depicted in FIG. 1, the engine 100 is configured with a turbocharger including a turbine 120 arranged along the exhaust passage 114 and a compressor 122 arranged in the intake passage 106. The compressor 122 may be at least partially powered by the turbine 120 via a shaft (not shown). The turbocharger increases air charge of ambient air drawn into the intake passage 106 in order to provide greater charge density during combustion to increase power output and/or engine-operating efficiency. While in this case a single turbocharger is included, the system may include multiple turbine and/or compressor stages.

Further, as shown in FIG. 1, a charge air cooler (CAC) 124 is arranged along the intake passage 106 upstream of the throttle 62 for cooling intake air after it has passed through the turbine 120 and the compressor 122 of the turbocharger. Condensate that is formed in the CAC 124 may be carried out of the CAC 124 by intake air passing through the CAC 124, and may be ingested by cylinders of the engine 100. In some cases, the condensate ingested by the engine may result in cylinder bank misfire, for example. As described in greater detail with relation to FIG. 3, such misfire may be detected by monitoring each of crankshaft torsional vibrations, exhaust gas air fuel ratio, and exhaust temperature. During a misfire event, there may be fluctuations in the crankshaft torsional vibration together with a higher than threshold air fuel ratio and a higher than threshold exhaust temperature. Responsive to detection of such a misfire event, a cylinder bank may be deactivated and then sequentially reactivated under certain conditions in order to reduce degraded vehicle performance resulting from cylinders deactivated for an extended period. Thus, the engine system further includes a crankshaft position sensor 126, or Hall effect sensor coupled to the crankshaft 128, configured to monitor the position and/or rotational speed of the crankshaft 128.

The engine 100 of FIG. 1 may further include a low-pressure exhaust gas recirculation (EGR) system for routing exhaust gas from downstream of the turbine to upstream of the compressor. Such operation may exacerbate condensate formation under selected conditions. The methods of operating the engine may include flowing low-pressure EGR during engine operation. Also, the engine may comprise a high-pressure EGR system for routing exhaust gas from upstream of the turbine to downstream of the compressor.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include crankshaft position sensor 126, or Hall effect sensor, exhaust gas oxygen sensor 116, exhaust gas temperature sensor 117, MAP sensor, exhaust pressure sensor, compressor inlet temperature sensor, compressor inlet pressure sensor, compressor inlet humidity sensor, and EGR sensor. Other sensors such as additional pressure, temperature, air fuel ratio, and composition sensors may be coupled to various locations in engine system 100. The actuators 18 may include, for example, throttle 108, EGR valve, wastegate, and fuel injector. The control system 14 may include a controller 12. The controller 12 may receive input data from the various sensors, process the input data, and trigger various actuators in response to the processed input data based on instruction or code programmed therein corresponding to one or more routines. In one example, the controller may receive inputs from each of the crankshaft position sensor 126, the exhaust gas oxygen sensor 116, and the exhaust gas temperature sensor 117 to determine the occurrence of a cylinder misfire event. In response to a detection of a misfire event, the controller 12 may send a signal to the fuel injectors to discontinue fuel injection to one or more cylinders in the engine.

In the example of FIG. 1, the engine 100 is a variable displacement engine, in which a number of cylinders may be deactivated. Deactivation may include disabling fuel injection to the cylinder and/or holding the cylinder intake and exhaust valves closed, and trapping exhaust gas in the combustion chamber, during one or more engine cycles. Furthermore, cylinder deactivation may include deactivating the cylinder valves (e.g., intake valve and exhaust valve) via hydraulically actuated lifters coupled to valve pushrods, or via a cam profile switching mechanism in which a cam lobe with no lift is used for deactivated valves. Still other cylinder deactivation mechanisms may also be used, such as electrically actuated valves, disabled fuel injection with normal valve operation, etc. In one example, in response to the indication of a cylinder misfire event, one or more cylinders of a cylinder bank of the engine may be deactivated by suspending fuel injection to the one or more cylinders.

FIG. 2 is a block diagram of a vehicle driveline 200 and vehicle 290. Driveline 200 may be powered by engine 10. As such, engine 10 may be the multi-cylinder engine 100 as shown in FIG. 1. In one example, the engine 10 may be started via a driveline integrated starter/generator (DISG) 240. Further, engine 10 may generate or adjust torque via torque actuator 204, such as a fuel injector, throttle, etc.

An engine output torque may be transmitted to an input side of dual mass flywheel (DMF) 232 The DMF such as a pendulum damper may act as a damper for reducing torsional vibrations in the crankshaft. Engine speed as well as dual mass flywheel input side position and speed may be determined via engine position sensor 118. DMF 232 may include springs 205 and separate masses 207 for dampening driveline torque disturbances. The output side of DMF 232 is shown being mechanically coupled to the input side of driveline disconnect clutch 236. Disconnect clutch 236 may be electrically or hydraulically actuated. The input side of the dual mass flywheel may move relative to the output side of the dual mass flywheel. Springs 205 apply force to limit motion of the output side of the dual mass flywheel (e.g., the disconnect clutch side) relative to the input side of the dual mass flywheel (e.g., the engine side). A position sensor 234 is positioned on the disconnect clutch side of DMF 232 to sense the output position and speed of the dual mass flywheel 232. The downstream side of disconnect clutch 236 is shown mechanically coupled to DISG input shaft 237.

In one example, engine operations at certain speed levels may excite a resonant frequency in the DMF. This may result in higher than threshold crankshaft torsional vibrations that may be erroneously detected by a crankshaft acceleration sensor as an engine misfire event. An engine controller may be configured to adjust a misfire detection routine during conditions when the DMF is within a threshold distance of resonant frequency range (e.g., within 5% of the threshold frequency). In particular, during DMF operation within or within a threshold distance of a resonant frequency range, instead of indicating misfire in one or more cylinders based on only the crankshaft accelerator response, the misfire detection module may assess one or more additional parameters indicative of a misfire event prior to confirmation of a misfire detection. Therefore, during a first condition, when the operating frequency of the DMF is outside of a threshold frequency range, cylinder misfire may be indicated based on a higher than threshold crankshaft torsional vibration and during a second condition, when the operating frequency of the DMF is inside (or close to) the threshold resonant frequency range, cylinder misfire may be indicated based on each of a higher than threshold air fuel ratio as estimated via an exhaust oxygen sensor, a higher than threshold exhaust gas temperature as estimated via an exhaust gas temperature sensor, and a higher than threshold crankshaft torsional vibration as estimated via the crankshaft acceleration sensor. In response to misfire detection, one or more cylinders may be deactivated and maintained in the deactivated state until it is confirmed that DMF is no longer operating within the resonant frequency range. An example routine is elaborated with reference to FIG. 3.

DISG 240 may be operated to provide torque to driveline 200 or to convert driveline torque into electrical energy to be stored in electric energy storage device 275. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to input shaft 270. Input shaft 270 mechanically couples torque converter 206 to transmission 208. In one example the transmission 208 may be an automatic transmission. In another example, the transmission 208 may be an automated manual transmission comprising automatic clutches and in yet another example, the transmission 208 may be a manual transmission system. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination driveline position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request. Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. In one example, the controller 12 may vary engine speed by shifting gear in the automatic transmission 208 or by varying the torque converter 206 slip schedule to decouple vibration input into transmission 208. The slip schedule may be adjusted in a manner such that it may cancel torsion vibration made by the engine.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

The controller 12 receives signals from the various sensors of FIGS. 1-2 and employs the various actuators of FIGS. 1-2 to adjust engine operation based on the received signals and instructions stored on a memory of the controller. For example, based on inputs from engine 10, as shown in more detail in FIG. 1, the controller ma control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. As another example, based on input from the exhaust temperature sensor, crankshaft acceleration sensor, and exhaust gas oxygen sensor, the controller may determine an engine misfire event and accordingly send a signal to deactivate fuel and spark to the misfiring cylinder.

In this way, the systems of FIGS. 1 and 2 provide for a system comprising: an engine with a first and a second cylinder group, a plurality of fuel injectors for injecting fuel into cylinders of the first and second cylinder group, a dual mass flywheel including a pendulum damper, a transmission, a torque converter, an exhaust system including an exhaust oxygen sensor and an exhaust gas temperature sensor, a crankshaft acceleration sensor coupled to the engine, and a controller. The controller may be configured with computer readable instructions stored on non-transitory memory for: operating a DMF while combusting fuel in the engine, estimating an operating frequency of the DMF based on engine speed, during a first condition, when the operating frequency of the DMF is outside of a threshold frequency range, indicating cylinder misfire based on crankshaft torsional vibration estimated via the crankshaft acceleration sensor, and during a second condition, when the operating frequency of the DMF is inside the threshold frequency range, indicating cylinder misfire based on each of the crankshaft torsional vibration, exhaust gas temperature, and exhaust air fuel ratio.

Figure 3:
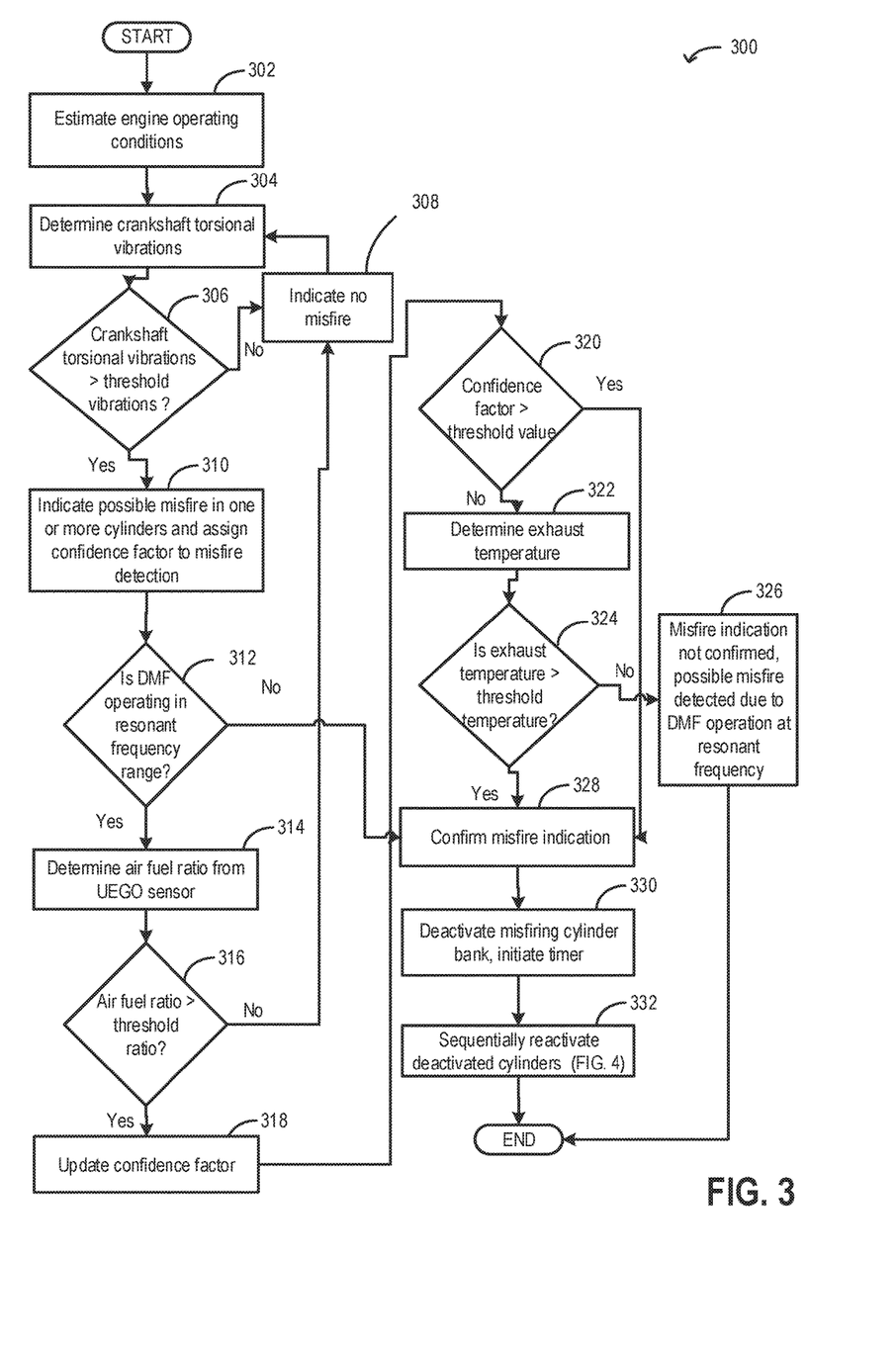
FIG. 3 shows a flow chart illustrating an example method that may be implemented for detection of engine misfire.

FIG. 3 illustrates an example method 300 for detection of a cylinder misfire event with a high confidence value. Instructions for carrying out method 300 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, the routine includes estimating current engine operating parameters including, for example, engine load, engine speed, vehicle speed, crankshaft acceleration, exhaust air fuel ratio, exhaust gas temperature, manifold vacuum, throttle position, spark timing, EGR flow, exhaust pressure, number of activated cylinders, etc.

At 304, crankshaft torsional vibrations may be estimated from crankshaft acceleration as determined via a crankshaft sensor attached to the crankshaft (such as the crankshaft sensor 126 shown in FIG. 1). Once the torsional vibrations are determined, at 306, the routine includes determining if the crankshaft torsional vibrations are greater than a threshold vibration level. Alternatively, the crankshaft acceleration corresponding to the crankshaft torsional vibration may be determined and the crankshaft acceleration may be compared to a threshold acceleration above which vibration may occur. In one example, the threshold torsional vibrations may correspond to expected values of crankshaft acceleration when all active cylinders are optimally operational. As another example, the threshold vibrations may be estimated in specific crank intervals aligned with the firing period of a particular cylinder. If it is determined that the crankshaft torsional vibration is lower than the threshold vibration level, at 308 a misfire event may not be indicated, and engine operation may be continued.

If it is determined that torsional vibrations are higher in specific crank intervals aligned with the firing period of a particular cylinder, then at 310, a possible misfire may be indicated. In addition, a confidence factor with a low initial value may be assigned to the indication of the possible misfire event. Further, the value of the confidence factor may be updated based on DMF operating frequency, as elaborated below.

At 312, the routine includes determining if the DMF is operating within a threshold of a resonant frequency range, or within a threshold frequency range. In one example, a DMF operating frequency may be estimated based on engine speed, wherein the DMF operation includes the DMF operating frequency approaching the resonant frequency such as reaching within the threshold range of one of a fundamental resonant frequency and harmonics of the resonant frequency at one or more engine speed values. For example, the threshold resonant frequency range may include DMF operation within 5% of the resonant frequency (fundamental and harmonics). In an alternate example, a position sensor (such as sensor 234 in FIG. 2) coupled to the disconnect clutch side of the DMF may be used to estimate position, speed, and operating frequency of the dual mass flywheel. DMF operation within the threshold resonant frequency range may result in higher than threshold crankshaft torsional vibrations. If it is determined that the DMF is operating within a threshold of the resonant frequency range, at 314, the crankshaft acceleration sensor may detect a higher than threshold crankshaft torsional vibration (at 306) that may not correspond to a cylinder misfire event. Therefore, if a higher than threshold crankshaft torsional vibration is estimated during DMF operation with the threshold resonant frequency range, the value of confidence factor for the detection of misfire may be maintained at the lower value and further confirmation of the misfire event may be carried out based on inputs from one or more additional sensors. Else, if the higher than threshold crankshaft torsional vibration is estimated during DMF operation outside the resonant frequency range, the value of confidence factor for the detection of misfire may be increased and further confirmation of the misfire event may not be required if the updated confidence factor is higher than a threshold value, as elaborated at 328.

After confirming that the DMF is operating in the resonant frequency range, at 314, an exhaust air fuel ratio may be determined from an exhaust gas sensor, such as a universal exhaust gas oxygen sensor (UEGO) or a heated exhaust gas oxygen sensor (HEGO) (such as sensor 116 coupled to the exhaust passage as shown in FIG. 1). At 316, the routine includes determining if the estimated air fuel ratio is higher than a threshold air fuel ratio. The threshold air fuel ratio may correspond to a desired air fuel ratio or an expected air fuel ratio based on the current operating conditions. If it is determined that the air fuel ratio is not higher than the threshold (that is, not leaner than desired or expected), it may be inferred that there is no increase in un-combusted oxygen in the exhaust gas stream and therefore, at 308, a misfire event may not be confirmed, and engine operation may be continued. In an alternate example however, even after the detection of lower than threshold air fuel ratio, the routine may move on to 318 to continue with the misfire diagnostic process.

If the air fuel ratio is higher than the threshold, at 318, the confidence factor of the misfire event indication (initially determined based on crankshaft vibration) may be updated based on the exhaust air fuel ratio. As an example, when cylinder bank misfire occurs, the exhaust air fuel ratio may become leaner due to un-combusted oxygen in the exhaust gas stream and at this time, the confidence factor may be raised based on the difference between the estimated air fuel ratio and the threshold air fuel ratio. In an alternate example, a first confidence value for the misfire event may be determined based on the crankshaft acceleration only and a second confidence value may be determined based on the exhaust air fuel ratio only and at 318, the confidence factor associated with the misfire detection may be updated based on the first and second confidence values.

At 320, the routine includes determining if the confidence factor is higher than a threshold value. The confidence factor reaching the threshold value may confirm the indicated misfire event. If it is determined that the value of the confidence factor as estimated based on the higher than threshold crankshaft torsional vibration and the higher than threshold air fuel ratio is lower than the threshold confidence factor, the routine may further determine exhaust gas temperature for confirmation of the misfire event.

At 322, exhaust gas temperature may be estimated from an exhaust gas temperature sensor such as sensor 117 in FIG. 1. At 324, the routine includes determining if the estimated exhaust temperature is higher than a threshold temperature. The threshold temperature may correspond to a desired or an expected exhaust gas temperature based on the current engine operating conditions. As an example, when a misfire event occurs, the exhaust temperature may increase due to the air and fuel reacting exothermally in the exhaust conduit. If it is determined that exhaust temperature is lower than the threshold temperature, at 322, the misfire event (as detected by crankshaft accelerator sensor at 310) may not be confirmed. At this stage, it may be inferred that the misfire indication may be due to the crankshaft vibrations caused by DMF operation within the resonant frequency range.

If it is determined that the exhaust temperature is higher than the threshold temperature, at 328, the confidence factor may be further updated, the confidence factor now exceeding the threshold such that the misfire event is confirmed. In response to indication of cylinder misfire based on each of a higher than threshold air fuel ratio, a higher than threshold exhaust gas temperature, and a higher than threshold crankshaft torsional vibration, it may be inferred that the value of the confidence factor is higher than the threshold, therefore confirming the misfire indication.

If it is determined at step 320 that the confidence factor is higher than the threshold, the routine may directly move on to 328 and the misfire indication may be confirmed without requiring the additional input based on the exhaust temperature.

Also, if at 312 it was determined that the DMF operation is outside of the resonant frequency or if the DMF is not operating, a higher value (that is, above the threshold) may be assigned to the confidence factor and misfire detection may be confirmed solely based on crankshaft acceleration sensor response.

In one example, even if the DMF is not operating within the resonant frequency range, the routine may include confirmation of the misfire event via monitoring of air fuel ratio and exhaust gas temperature. However, in this case, the routine may include adjusting one or more of the threshold exhaust air fuel ratio and the threshold exhaust gas temperature based on an operating frequency of the DMF relative to the resonant frequency, the adjusting including increasing or decreasing the threshold ratio and increasing or decreasing the threshold temperature when the operating frequency of the DMF coincides with the resonant frequency.

In response to a confirmation of a misfire event, at 330, the cylinder bank in which misfire is occurring may be deactivated. As an example, the misfiring event may occur in one or more cylinders in the cylinder bank. In order to deactivate the cylinders of a bank, fuel injection to the misfiring cylinder(s) may be cut-off or the cylinder valves (e.g., intake and exhaust valves) may be deactivated. In addition, the misfire count and history of the misfiring cylinder may be updated in the controller's memory. At this time, a timer may also be initiated to record a time elapsed since the cylinder bank deactivation. In another example, only the cylinder in which misfiring has been detected (based on the firing sequence of the cylinder) may be selectively deactivated while maintaining the other cylinders of the bank active. One or more cylinders may be maintained deactivated until the DMF operating frequency is moved outside of the resonant frequency. At 332, after confirmation of DMF operation outside the resonant frequency range, the cylinders may be sequentially reactivated. Details relating to the reactivation of the cylinders is described in relation to FIG. 4.

In this way, in response to a higher than threshold crankshaft torsional vibration estimated based on crankshaft acceleration, cylinder misfire may be indicated with a confidence factor assigned based on DMF operation. The confidence factor may be selectively updated during operation of the DMF based on each of an exhaust air fuel ratio and an exhaust gas temperature. Further, a misfire mitigating action may be performed in response to the confidence factor of a misfiring cylinder exceeding a threshold value. As such, degradation of engine and/or vehicle performance may be minimized when a cylinder bank is deactivated responsive to misfire due to issues such as ingestion of charge air cooler condensate by the engine.

Figure 4:
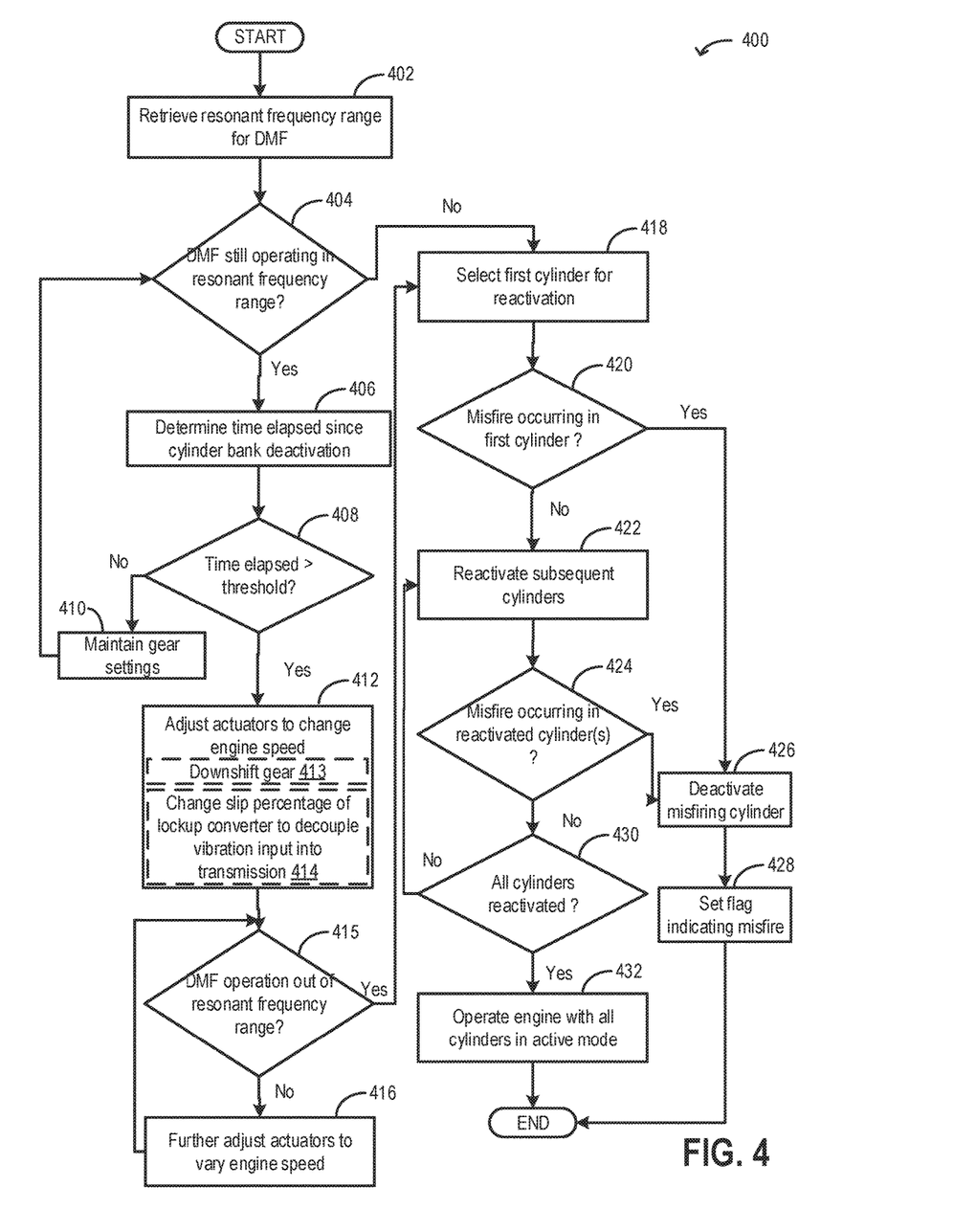
FIG. 4 shows a flow chart illustrating an example method that may be implemented for selectively reactivating cylinders that were deactivated in response to detection of a cylinder misfire event.
Figure 5A:
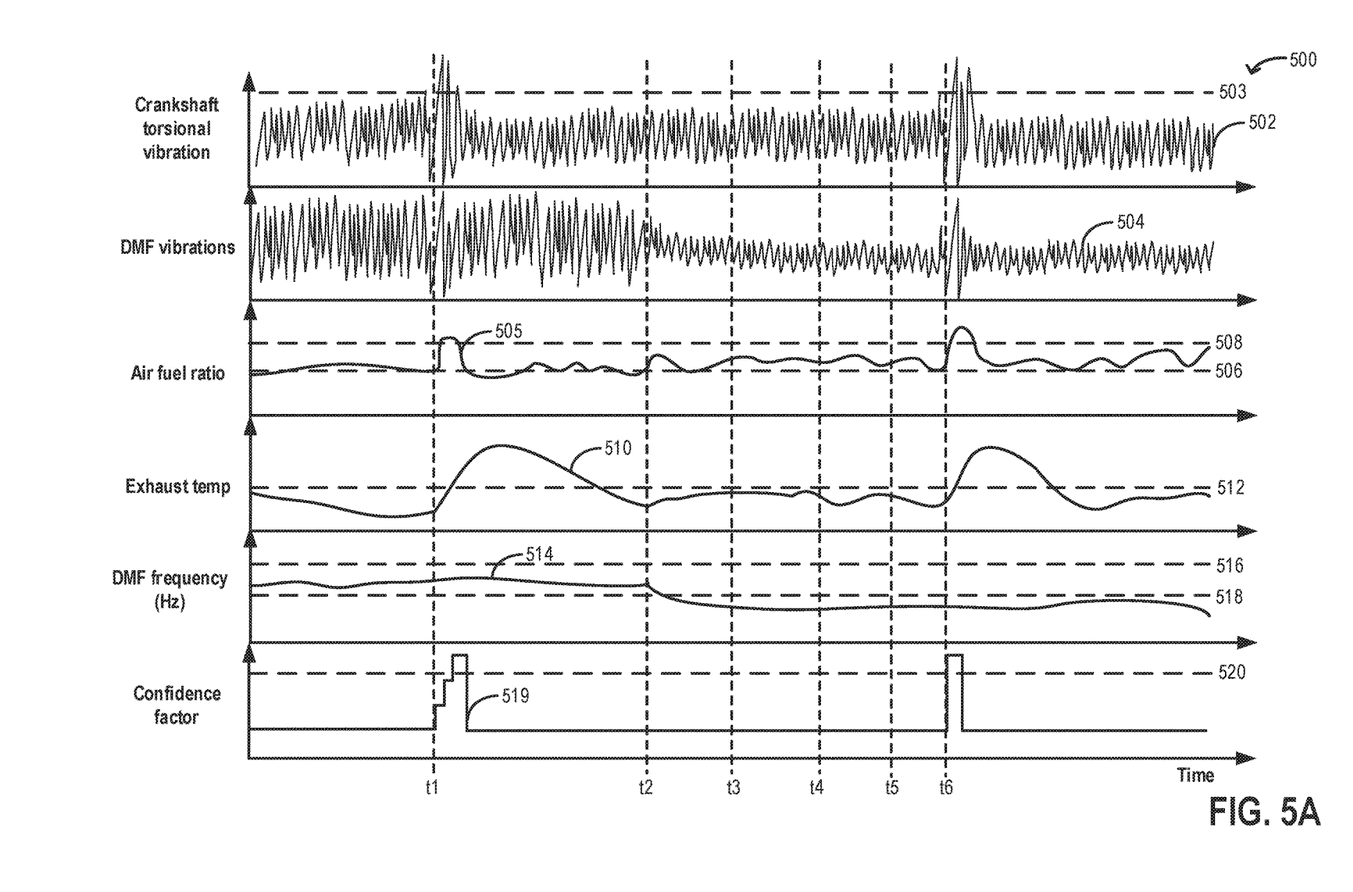
FIG. 5A shows an example of cylinder misfire detection and subsequent cylinder deactivation, according to the present disclosure.
Figure 5B:
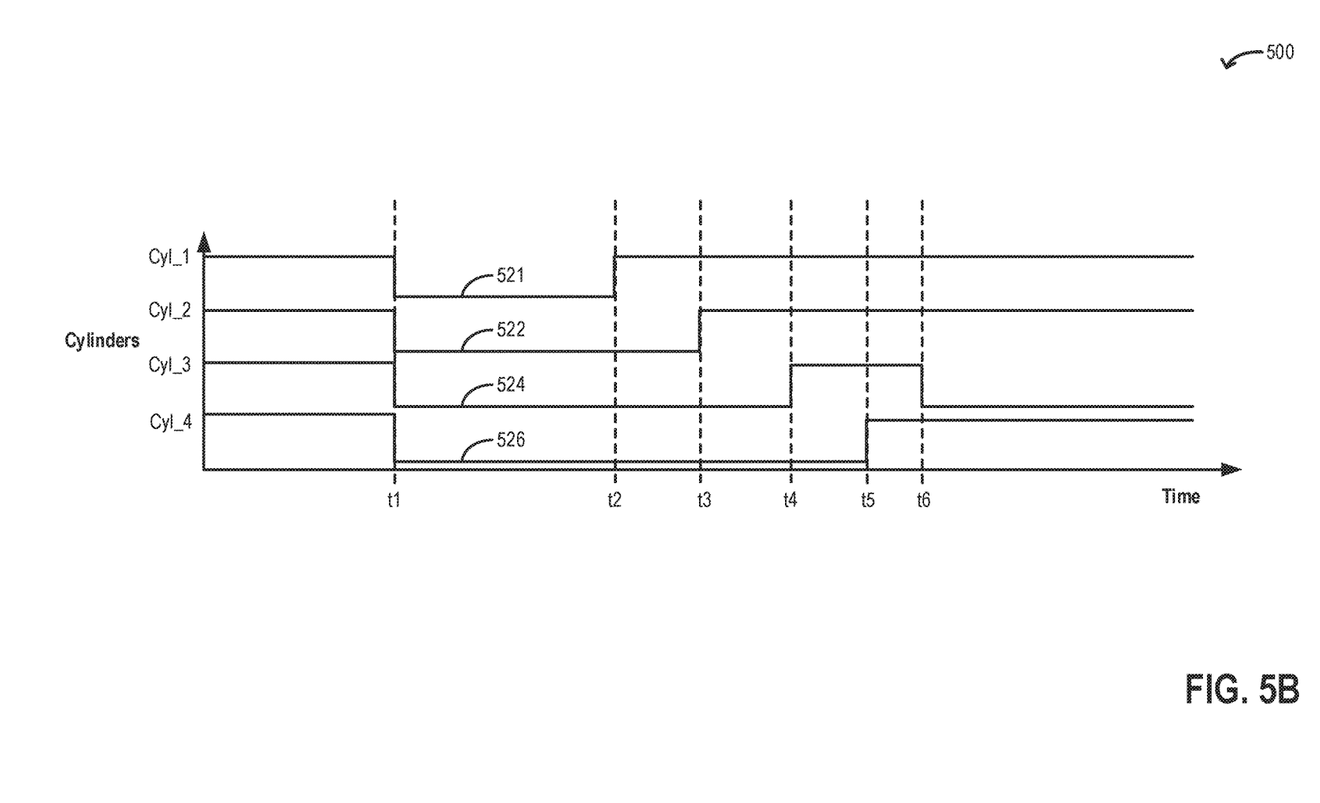
FIG. 5B shows an example of reactivation of deactivated cylinders, according to the present disclosure.

FIG. 4 illustrates an example method 400 for selective reactivation of cylinders that have been deactivated in response to detection of a misfire event based on each of a higher than threshold fluctuations in crankshaft torsional vibration, a higher than threshold air fuel ratio, and a higher than threshold exhaust temperature. The routine 400 may be carried out at step 332 of the example routine 300 in FIG. 3.

At 402, a resonant frequency range for a dual or variable mass flywheel (DMF) coupled to the vehicle driveline may be retrieved. In one example, the resonant frequency range may be within 5% of one of a fundamental resonant frequency or the harmonics of the DMF resonant frequency. At certain engine speeds, the DMF may operate within the resonant frequency range. During operation in the resonant frequency range, there is an increase in crankshaft torsional vibrations that may be erroneously detected by the crankshaft acceleration sensor as a misfire event. As such, at step 312 of the misfire detection routine 300 of FIG. 3, it may have been determined that the DMF was operating within the resonant frequency range. Therefore at 404, the routine may include determining if the DMF is continuing to operate within the resonant frequency range. The cylinders deactivated at routine 300 responsive to the detection of a misfire event may be sequentially reactivated once it is confirmed that the DMF is no longer operating within the resonant frequency range, and consequently further erroneous detection of misfire via a crankshaft acceleration sensor may be avoided. If it is determined that the DMF is still operating within the resonant frequency range, at 406, the time elapsed since the deactivation of the cylinders banks (at step 326, FIG. 3) may be determined. The time elapsed may be estimated from the timer initiated at step 326 in FIG. 3.

At 408, the routine includes determining if the time elapsed since the deactivation of the cylinder bank is greater than a threshold time period. As such, engine output may be limited while the cylinder bank is in a deactivated state. Therefore if the DMF continues to operate within the resonant frequency range longer than the threshold time period, adjustments to engine operation may be carried out to actively change the DMF frequency so that cylinder reactivation may be initiated. If it is determined that the time elapsed since cylinder bank deactivation is lower than the threshold time period, engine operation may be maintained. For example, gear settings in the transmission (such as transmission system 208 of FIG. 2) may be maintained and engine operation with a deactivated cylinder bank may be continued. DMF operation is continued to be monitored to detect any shift from its resonant frequency.

If it is determined that the time elapsed on the timer since the deactivation of the cylinder bank is greater than the threshold time period, at 412, one or more engine actuators may be adjusted to change engine speed and consequently shift DMF operation outside the resonant frequency range in order to initiate the cylinder reactivation process. In one example, at 413, for engine systems coupled to an automatic transmission, a transmission gear downshift may be carried out while for engine systems coupled to a manual transmission, a transmission gear downshift may be requested (such as by displaying the request to a vehicle operator). In another example, at 414, a torque converter slip schedule (e.g., slip percentage) may be changed to decouple vibration input from the DMF into the transmission. In addition, in vehicles with an automated manual transmission comprising automatic clutches, the controller may perform a rapid clutch disengagement or controlled clutch slip coincident with the cylinder reactivation process in order to allow a torque transition to change the engine speed and correspondingly change the DMF operational frequency. As such, the slip schedule may be adjusted in a manner such that it may cancel torsion vibration made by the engine.

After the engine actuators have been adjusted to change the engine speed, at 415, the routine includes determining if the DMF operation has moved out of its resonant frequency range. If it determined that the DMF is continuing to operate within the resonant frequency range, at 416, one or more engine actuators may be further adjusted to vary the engine speed and the corresponding change in DMF operation may be monitored.

If it is confirmed that the DMF is no longer operating within the resonant frequency range, at 418, the deactivated cylinders may be sequentially reactivated. In one example, an order of the sequential reactivation may be based on firing order. In another example, cylinder reactivation sequence may be based on an individual cylinder's deactivation history. Further still, the cylinder reactivation sequence may be based on an individual cylinder's misfire history. If an individual cylinder has previously been deactivated due to misfire detection(s) or has been previously deactivated for longer than remaining cylinders of a given bank, that cylinder may be the first cylinder that is selected for reactivation.

If it is determined (at 404) that the DMF is no longer operating within the resonant frequency range, the routine may directly proceed to step 418 wherein a first cylinder of the deactivated cylinder bank may be selectively reactivated.

In order to reactivate the cylinder, fuel injection to that cylinder may be resumed and/or the cylinder valves (e.g., intake and exhaust valves) may be reactivated. Once the reactivated cylinder is fully operational, at 420, the routine includes determining if misfire is occurring again in the first cylinder that was reactivated. Misfire detection may be carried out via one or more of a crankshaft acceleration sensor, an exhaust gas oxygen sensor, and an exhaust gas temperature sensor, as previously elaborated at FIG. 3. As one example, higher than threshold fluctuations in the crankshaft torsional vibration, as detected by a crankshaft acceleration sensor, may be indicative of a misfire event. Since at this time the DMF is no longer operating within the resonant frequency range, the output of the crankshaft acceleration sensor may be solely utilized for misfire detection. As another example, in addition to crankshaft acceleration, air fuel ratio and/or exhaust gas temperature may also be monitored for misfire detection.

If it is determined that a misfiring event is occurring in the first cylinder, at 426, the misfiring cylinder may be deactivated so that engine performance is not degraded. At 428, a diagnostic code or flag may be set indicating the cylinder misfire and the misfire count of the cylinder may be updated. The misfiring cylinder may be maintained in deactivated state until an input from an operator (such as a service technician) indicative of cylinder servicing is received and the diagnostic code is cleared.

If (at 420) it is determined that the first cylinder to be reactivated is not misfiring, at 422, the subsequent cylinders may be sequentially reactivated at a regular predefined interval. Each time a cylinder is activated, at 424, the routine includes determining if misfire is occurring in the reactivated cylinder(s). If it is determined that a misfire event is occurring in any of the subsequently reactivated cylinders, the routine may proceed to 426 wherein the misfiring cylinder may be selectively deactivated and maintained in the deactivated state until the cylinder is serviced. At 430, the routine includes determining if all the cylinders have been reactivated following the deactivation event (at 326, FIG. 3) responsive to the misfire detection. If it is determined that all the cylinders have not yet been reactivated, the routine may move to 422 and cylinder reactivation may be continued.

If it is confirmed that all the cylinders have been activated and none of the cylinders are misfiring following the reactivation, at 432, the engine may be operated with all cylinders of each cylinder bank operating in active mode. In this way, cylinders deactivated responsive to a misfire detection may be reactivated one by one once it has been confirmed that the DMF is no longer operating within the threshold resonant frequency range and consequently further erroneous detection of cylinder misfire may be reduced.

FIGS. 5A and 5B show an example operating sequence 500 illustrating cylinder misfire detection based on a plurality of sensor outputs and a subsequent cylinder reactivation sequence. The horizontal (x-axis) denotes time and the vertical markers t1-t6 identify significant times in cylinder misfire detection, cylinder deactivation, and subsequent reactivation processes.

The first plot from the top, line 502, shows crankshaft torsional vibrations as estimated by a crankshaft acceleration sensor. Dotted line 503 shows a threshold for crankshaft torsional vibration. The second plot, line 504 shows DMF vibrations as estimated from engine speed. The third plot, line 505, shows a variation in an exhaust air fuel ratio (AFR) estimate as determined by one or more exhaust gas oxygen sensors (such as exhaust gas oxygen sensor (UEGO) and/or a tailpipe heated gas oxygen sensor (HEGO)). The exhaust AFR is shown relative to a stoichiometric level of AFR at 506. Line 508 corresponds to a threshold level in AFR used for cylinder misfire detection.

The fourth plot, line 510, shows a variation in exhaust gas temperature as estimated by an exhaust gas temperature sensor. Dotted line 512 shows a threshold level of exhaust gas temperature used for cylinder misfire detection. The fifth plot, line 514, shows an operating frequency (in Hz) of a dual or variable mass flywheel (DMF) coupled to the vehicle drivetrain. Dotted lines 516 and 518 show an upper and a lower boundary, respectively, of a resonant frequency range of the DMF. The resonant frequency range may be within 5% of the fundamental resonant frequency of the DMF. The sixth plot, line 519, shows a variation in value of a confidence factor based on misfire detection via one or more sensors. Dotted line 520 denotes a threshold value of confidence factor corresponding to the confirmation of a misfire event.

The seventh plot, in FIG. 5B, shows the operational state (active or inactive) of four cylinders in a cylinder bank. A first cylinder, Cyl_1, is depicted by line 521, a second cylinder, Cyl_2, is depicted by line 522, a third cylinder, Cyl_3, is depicted by line 524, and a fourth cylinder, Cyl_4, is depicted by line 526.

Prior to time t1, the engine operates with all cylinders in the cylinder bank in an active state with lower than threshold crankshaft torsional vibrations. For the crankshaft torsional vibrations, the magnitude of the peaks/valleys of each nominal vibration may be fairly stable for a given engine speed and engine load. The vibrational amplitude for a given engine speed and load may be consistent and repeatable. During this time, crankshaft torsional vibrations, based on engine speed are below the threshold level indicating scheduled combustion in the engine cylinders. Further, the AFR is maintained at or around the stoichiometric level and exhaust temperature is lower than the threshold temperature. Based on the manufactured characteristics of the DMF, particular engine speed, and load points may cause a natural increase in the DMF operating frequency such that it begins to resonate. During this time, the DMF may be operating at a frequency within its resonant frequency range causing vibrations of higher amplitudes.

At time t1, a higher than threshold variation in crankshaft torsional vibrations may be detected by the crankshaft acceleration sensor, indicating a possibility of a cylinder misfire event. Correspondingly, a higher amplitude vibration may be detected at the DMF. During DMF operation in the resonant frequency range, there may be a higher than threshold crankshaft torsional vibration which may be erroneously detected by the crankshaft acceleration sensor as a misfire event. Therefore, at this time, the misfire detection by the crankshaft acceleration sensor may be assigned a lower value of the confidence factor. The value of the confidence factor after misfire indication based on the crankshaft acceleration sensor output is below the threshold confidence factor and therefore may not be used for misfire detection confirmation. In order to confirm the indication of the misfire event with a higher certainty, AFR and exhaust temperature may be concurrently estimated at time t1 and the confidence factor may be updated accordingly. In this example, it is observed that at time t1, the estimated AFR is above the threshold AFR and that the estimated exhaust temperature is also above the threshold temperature. Based on the higher than threshold variation in crankshaft torsional vibrations, higher than threshold AFR, and higher than threshold exhaust gas temperature, the confidence factor may be raised to above the threshold confidence factor and it may be inferred that a misfire event has occurred in one or more cylinders in the cylinder bank. In response to the detection of the misfire event, the four cylinders of the cylinder bank may be deactivated at time t1. In order to deactivate the cylinders, fuel injection to the cylinders may be cut-off and/or the cylinder valves (e.g., intake and exhaust valves) may be deactivated.

Between time t1 and t2, the four cylinders of the cylinder bank may be maintained in a deactivated state. During this time, the DMF continues to operate in its resonant frequency range and therefore cylinder reactivation is not carried out to avoid any erroneous detection of misfire in the reactivated cylinders. Once the cylinder bank is deactivated, the crankshaft torsional vibration may decrease to a lower than threshold level. Also, the AFR may resume to be in the stoichiometric level and the exhaust temperature may be lower than the threshold temperature.

At time t2, it may be determined that a higher than threshold time has elapsed since the deactivation of the cylinder bank at t1, and further continuation of cylinder bank deactivation may affect engine performance. Prior to reactivation of cylinders, DMF operating frequency may be shifted out of its resonant frequency range. A change in DMF operating frequency may be carried out at t2 by changing the engine speed via adjustments to one or more engine actuators. In one example, a transmission gear may be downshifted. In another example, for automatic transmission, a torque converter slip schedule (percentage) may be changed (increased or decreased) to decouple vibration input into transmission.

At time t2, it may be confirmed that the engine speed has changed and consequently the DMF operation has shifted to outside the resonant frequency range. Due to the change in DMF operational frequency, the amplitude of DMF vibrations may reduce. At this time cylinder reactivation may be initiated. Based on the firing order, a first cylinder of the cylinder bank may be selectively reactivated at time t1. In order to reactivate a cylinder, fuel injection to the particular cylinder may be resumed and/or the cylinder valves (e.g., intake and exhaust valves) may be reactivated. Following the reactivation of the cylinder, between time t2 and t3, each of the crankshaft torsional vibration, the AFR, and the exhaust gas temperature may be monitored for detection of any misfire occurring at the reactivated cylinder which may be indicative of cylinder malfunction.

Subsequently, at time t3, a second cylinder of the cylinder bank may be selectively reactivated, at time t4, a third of the cylinder bank may be reactivated and at time t5, a fourth cylinder of the cylinder bank may be reactivated. The order of reactivation may follow the firing sequence of the cylinders. Cylinder reactivation may be carried out at regular time intervals. The intervals may further depend on the type of engine. Each of the crankshaft torsional vibration, the AFR, and the exhaust gas temperature may be continued to be monitored for detection of any misfire.

Between time t5 and t6, all four cylinders of the cylinder bank may be active. However, at time t6, higher than threshold crankshaft torsional vibrations are observed indicating a misfire event. Also, at this time, the DMF vibrations may have increased amplitude. Based on the firing sequence of the cylinders, it may be determined that the third cylinder has misfired. Since at this time, the DMF is operating outside the resonant frequency range, misfire detection by the crankshaft acceleration sensor may have a higher than threshold confidence factor. Also, a leaner than threshold AFR and a higher than threshold exhaust temperature may further confirm the misfire detection.

At time t6, in response to the detection of the misfire event, the misfiring cylinder (third cylinder) may be selectively deactivated such that engine performance is not degraded. A diagnostic code (flag) may be set indicating cylinder misfire. After time t6, the individual cylinder may be maintained in the deactivated state until the vehicle is serviced.

In this way, cylinder misfire may be indicated based on a higher than threshold crankshaft torsional vibration, and the indication may be confirmed based on a higher than threshold exhaust air fuel ratio and a higher than threshold exhaust gas temperature. In response to misfire confirmation, fueling via the plurality of fuel injectors to the cylinder group with one or more misfiring cylinders may be stopped, fueling deactivation maintained for the cylinder group until the DMF operates outside its resonant frequency, and in response to a change in DMF operating frequency, fueling to each cylinder of the cylinder group may be resumed one by one.

One example method comprises, during dual mass flywheel (DMF) operation within a threshold range of a resonant frequency, indicating cylinder misfire based on each of a crankshaft torsional vibration, an exhaust air fuel ratio, and an exhaust gas temperature. The preceding example further comprises, additionally or optionally estimating a DMF operating frequency based on engine speed, wherein the DMF operation reaching the threshold range of the resonant frequency includes the DMF operating frequency reaching the threshold range of one of fundamental resonant frequency and harmonics of the resonant frequency at one or more engine speed values, wherein the threshold range is within a threshold of one of the fundamental resonant frequency and the harmonics, wherein the DMF includes a pendulum damper. Any or all of the preceding examples further comprises, additionally or optionally, in response to the indication of cylinder misfire, deactivating one or more cylinders of a cylinder bank of the engine by suspending fuel injection to the one or more cylinders. Any or all of the preceding examples further comprises, additionally or optionally, maintaining the one or more cylinders deactivated until the DMF operating frequency is outside of the threshold range of the resonant frequency. Any or all of the preceding examples further comprises, additionally or optionally, setting a timer responsive to the deactivation and responsive to a time elapsed on the timer since the deactivation reaching a threshold duration, adjusting an engine speed to shift the DMF operating frequency outside of the threshold range of the resonant frequency. In any or all of the preceding examples, additionally or optionally, the engine is coupled to a transmission via the DMF and a torque converter, and wherein adjusting the engine speed includes one or more of downshifting a transmission gear, and varying a torque converter slip schedule to decouple vibration input from the DMF into the transmission. Any or all of the preceding examples further comprises, additionally or optionally, responsive to shifting of DMF operating frequency outside of the threshold range, sequentially reactivating deactivated cylinders, an order of the sequential reactivation based on firing order. Any or all of the preceding examples further comprises, additionally or optionally, while sequentially reactivating the deactivated cylinders, monitoring each of the crankshaft torsional vibration, the exhaust air fuel ratio, and the exhaust temperature for further indication of misfire; and in response to the further indication of misfire in an engine cylinder during the sequential reactivation, deactivating the cylinder, setting a diagnostic code, and maintaining the cylinder deactivated state until an input indicative of cylinder servicing and clearance of diagnostic code is received. In any or all of the preceding examples, additionally or optionally, indicating cylinder misfire based on each of the crankshaft acceleration, the exhaust air fuel ratio, and the exhaust gas temperature includes indicating cylinder misfire based on a higher than threshold crankshaft torsional vibration, and confirming the misfire indication based on a higher than threshold exhaust air fuel ratio and a higher than threshold exhaust gas temperature. In any or all of the preceding examples, additionally or optionally, the crankshaft torsional vibration is estimated via a crankshaft acceleration sensor, the exhaust air fuel ratio is estimated via an exhaust oxygen sensor, and the exhaust gas temperature is estimated via an exhaust gas temperature sensor, and wherein the estimating via the crankshaft acceleration sensor, the exhaust oxygen sensor and the exhaust gas temperature sensor occur concurrently.

Another example method an engine coupled to a dual mass flywheel (DMF), comprises, in response to higher than threshold crankshaft torsional vibration estimated based on crankshaft acceleration, indicating cylinder misfire with a confidence factor assigned based on DMF operation; selectively updating the confidence factor during operation of the DMF based on each of an exhaust air fuel ratio and an exhaust gas temperature; and performing a misfire mitigating action in response to the confidence factor of a misfiring cylinder exceeding a threshold value. In the preceding example, additionally or optionally, the confidence factor assigned based on DMF operation includes assigning a lower confidence factor when the DMF operation is at a resonant frequency and assigning a higher confidence factor when the DMF operation is outside of the resonant frequency or when the DMF is not operating. In any or all of the preceding examples, additionally or optionally, selectively updating the confidence factor includes updating the confidence factor when the DMF operation is at the resonant frequency and not updating the confidence factor when the DMF operation is outside the resonant frequency or when the DMF is not operating, wherein the DMF includes a pendulum damper. In any or all of the preceding examples, additionally or optionally, the selectively updating based on each of the exhaust air fuel ratio and the exhaust gas temperature includes raising the confidence factor as the exhaust air fuel ratio exceeds a threshold ratio and as the exhaust gas temperature exceeds a threshold temperature. Any or all of the preceding examples further comprises, additionally or optionally, adjusting one or more of the threshold exhaust air fuel ratio and the threshold exhaust gas temperature based on an operating frequency of the DMF relative to the resonant frequency, the adjusting including increasing/decreasing the threshold ratio and increasing/decreasing the threshold temperature when the operating frequency of the DMF coincides with the resonant frequency. In any or all of the preceding examples, additionally or optionally, the misfiring cylinder is located on a first engine bank, and wherein performing a misfire mitigating action includes deactivating fuel to one or more cylinders of the first bank while maintaining fueling to cylinders of a second engine bank. Any or all of the preceding examples further comprises, additionally or optionally, sequentially reactivating the one or more cylinders of the first bank; and in response to a further indication of misfire in an individual cylinder of the first bank, selectively deactivating the individual cylinder, and maintaining the individual cylinder deactivated until an operator input indicative of cylinder servicing is received.

In yet another example, a system comprises an engine with a first and a second cylinder group, a plurality of fuel injectors for injecting fuel into cylinders of the first and second cylinder group, a dual mass flywheel including a pendulum damper, a transmission, a torque converter, an exhaust system including an exhaust oxygen sensor and an exhaust gas temperature sensor, a crankshaft acceleration sensor coupled to the engine, and a controller with computer readable instructions stored on non-transitory memory for: operating a DMF while combusting fuel in the engine, estimating an operating frequency of the DMF based on engine speed, during a first condition, when the operating frequency of the DMF is outside of a threshold frequency range, indicating cylinder misfire based on crankshaft torsional vibration estimated via the crankshaft acceleration sensor, and during a second condition, when the operating frequency of the DMF is inside the threshold frequency range, indicating cylinder misfire based on each of the crankshaft torsional vibration, exhaust gas temperature, and exhaust air-fuel ratio. In the preceding example, additionally or optionally, during the first condition, cylinder misfire indication is based on a higher than threshold crankshaft torsional vibration and during the second condition, cylinder misfire indication is based on each of a higher than threshold air fuel ratio as estimated via the exhaust oxygen sensor, a higher than threshold exhaust gas temperature as estimated via the exhaust gas temperature sensor, and a higher than threshold crankshaft torsional vibration as estimated via the crankshaft acceleration sensor. In any or all of the preceding examples, additionally or optionally, the controller has further instructions for: stopping fueling via the plurality of fuel injectors to the cylinder group with one or more misfiring cylinders responsive to indication of misfire; adjusting at least one of a gear setting of the transmission system and a slip schedule of the torque converter to shift engine speed, wherein the adjusting includes at least one of downshifting the gear setting and changing a slip percentage of the torque converter; and in response to DMF operating frequency moving outside the resonant frequency range following the adjusting, resuming fueling to each cylinder of the cylinder group one by one, and in response to DMF operation remaining within the resonant frequency range following the adjusting, maintaining fueling deactivated for the cylinder group.

In this way, based on DMF operating frequency, cylinder misfire detection may be carried out with higher reliability utilizing one or more sensors including a crankshaft acceleration sensor, an exhaust gas oxygen sensor, and an exhaust gas temperature sensor. The technical effect of utilizing multiple sensors, such as the exhaust gas oxygen sensor, and exhaust gas temperature sensor, is that erroneous indication of cylinder misfire due to higher than threshold crankshaft torsional vibration caused by DMF operation within the resonant frequency range may be reduced. By sequentially reactivating cylinders, occurrence of misfire in a particular cylinder following the reactivation may be better detected and addressed by maintaining that cylinder deactivated while other cylinders are operated. By reducing the erroneous detection of misfire, unnecessary cylinder deactivation is reduced, thereby improving engine performance.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
    operating a dual mass flywheel (DMF) within a resonant frequency threshold range; responsive to the DMF operating within the range, indicating cylinder misfire based on each of a crankshaft torsional vibration, an exhaust air fuel ratio, and an exhaust gas temperature; and
    operating the DMF outside the range; responsive to the DMF operating outside the threshold range, indicating cylinder misfire based on only the crankshaft torsional vibration.

2. The method of claim 1, further comprising estimating a DMF operating frequency based on engine speed, wherein the DMF operation reaching the threshold range includes the DMF operating frequency reaching the threshold range of fundamental resonant frequency or harmonics of the resonant frequency at one or more engine speed values, wherein the threshold range is within a threshold of the fundamental resonant frequency or the harmonics, wherein the DMF includes a pendulum damper.

3. The method of claim 2, further comprising, in response to the indication of cylinder misfire, deactivating one or more cylinders of a cylinder bank of the engine by suspending fuel injection to the one or more cylinders.

4. The method of claim 3, further comprising maintaining the one or more cylinders deactivated until the DMF operating frequency is outside of the threshold range, and reactivating the deactivated cylinders thereafter, the method including operating the DMF outside of the threshold range.

5. The method of claim 3, further comprising setting a timer responsive to the deactivation and responsive to a time elapsed on the timer since the deactivation reaching a threshold duration, adjusting an engine speed to shift the DMF operating frequency outside of the threshold range.

6. The method of claim 5, wherein the engine is coupled to a transmission via the DMF and a torque converter, and wherein adjusting the engine speed includes downshifting a transmission gear and/or varying a torque converter slip schedule to decouple vibration input from the DMF into the transmission.

7. The method of claim 6, further comprising responsive to shifting of the DMF operating frequency outside of the threshold range, sequentially reactivating deactivated cylinders, an order of the sequential reactivation based on firing order.

8. The method of claim 7, further comprising, while sequentially reactivating the deactivated cylinders, monitoring each of the crankshaft torsional vibration, the exhaust air fuel ratio, and the exhaust gas temperature for further indication of misfire; and in response to the further indication of misfire in an engine cylinder during the sequential reactivation, deactivating the cylinder, setting a diagnostic code, and maintaining the cylinder deactivated until an input indicative of cylinder servicing and clearance of diagnostic code is received.

9. The method of claim 1, wherein indicating cylinder misfire based on each of the crankshaft acceleration, the exhaust air fuel ratio, and the exhaust gas temperature includes indicating cylinder misfire based on a higher than threshold crankshaft torsional vibration, and confirming the misfire indication based on a higher than threshold exhaust air fuel ratio and a higher than threshold exhaust gas temperature.

10. The method of claim 9, wherein the crankshaft torsional vibration is estimated via a crankshaft acceleration sensor, the exhaust air fuel ratio is estimated via an exhaust oxygen sensor, and the exhaust gas temperature is estimated via an exhaust gas temperature sensor, and wherein the estimating via the crankshaft acceleration sensor, the exhaust oxygen sensor, and the exhaust gas temperature sensor occur concurrently.

11. A method for an engine coupled to a dual mass flywheel (DMF), comprising:
    operating with higher than threshold crankshaft torsional vibration estimated based on crankshaft acceleration; and, in response to the higher than threshold crankshaft torsional vibration, indicating cylinder misfire with a confidence factor assigned based on DMF operating frequency;
    selectively updating the confidence factor during operation of the DMF based on each of an exhaust air fuel ratio and an exhaust gas temperature; and
    performing a misfire mitigating action in response to the confidence factor of a misfiring cylinder exceeding a threshold value.

12. The method of claim 11, wherein the confidence factor assigned based on the DMF operating frequency includes assigning a lower confidence factor when the DMF operation is at a resonant frequency and assigning a higher confidence factor when the DMF operation is outside of the resonant frequency or when the DMF is not operating, the method including operating the DMF at the resonant frequency and operating the DMF outside the resonant frequency or not at all.

13. The method of claim 12, wherein selectively updating the confidence factor includes updating the confidence factor when the DMF operation is at the resonant frequency and not updating the confidence factor when the DMF operation is outside the resonant frequency or when the DMF is not operating, wherein the DMF includes a pendulum damper.

14. The method of claim 12, wherein the selectively updating based on each of the exhaust air fuel ratio and the exhaust gas temperature includes raising the confidence factor as the exhaust air fuel ratio exceeds a threshold ratio and as the exhaust gas temperature exceeds a threshold temperature.

15. The method of claim 14, further comprising adjusting the threshold exhaust air fuel ratio and/or the threshold exhaust gas temperature based on an operating frequency of the DMF relative to the resonant frequency, the adjusting including increasing/decreasing the threshold exhaust air fuel ratio and increasing/decreasing the threshold exhaust gas temperature when the operating frequency of the DMF coincides with the resonant frequency.

16. The method of claim 11, wherein the misfiring cylinder is located on a first engine bank, and wherein performing the misfire mitigating action includes deactivating fueling to one or more cylinders of the first engine bank while maintaining fueling to cylinders of a second engine bank.

17. The method of claim 16, further comprising sequentially reactivating the one or more cylinders of the first engine bank; and, in response to a further indication of misfire in an individual cylinder of the first engine bank, selectively deactivating the individual cylinder, and maintaining the individual cylinder deactivated until an operator input indicative of cylinder servicing is received.

18. A system, comprising:
an engine with a first cylinder group and a second cylinder group;
a plurality of fuel injectors for injecting fuel into cylinders of the first and second cylinder groups;
a dual mass flywheel (DMF) including a pendulum damper;
a transmission;
a torque converter;
an exhaust system including an exhaust oxygen sensor and an exhaust gas temperature sensor;
a crankshaft acceleration sensor coupled to the engine; and
a controller with computer readable instructions stored on non-transitory memory for:
operating the DMF while combusting fuel in the engine;
estimating an operating frequency of the DMF based on engine speed;
during a first condition, when the operating frequency of the DMF is outside of a threshold frequency range, indicating cylinder misfire based on only crankshaft torsional vibration estimated via the crankshaft acceleration sensor; and
during a second condition, when the operating frequency of the DMF is inside the threshold frequency range, indicating cylinder misfire based on each of the crankshaft torsional vibration, an exhaust gas temperature, and an exhaust air-fuel ratio.

19. The system of claim 18, wherein, during the first condition, cylinder misfire indication is based on a higher than threshold crankshaft torsional vibration and, during the second condition, cylinder misfire indication is based on each of a higher than threshold exhaust air fuel ratio as estimated via the exhaust oxygen sensor, a higher than threshold exhaust gas temperature as estimated via the exhaust gas temperature sensor, and the higher than threshold crankshaft torsional vibration as estimated via the crankshaft acceleration sensor.

20. The system of claim 18, wherein the controller has further instructions for: stopping fueling via the plurality of fuel injectors to a cylinder group with one or more misfiring cylinders responsive to indication of misfire; adjusting at least one of a gear setting of the transmission and a slip schedule of the torque converter to shift engine speed, wherein the adjusting includes downshifting a gear setting and/or changing a slip percentage of the torque converter; and, in response to the DMF operating frequency moving outside the threshold frequency range following the adjusting, resuming fueling to each cylinder of the cylinder group one by one, and, in response to the operating frequency of the DMF remaining within the threshold frequency range following the adjusting, maintaining fueling deactivated for the cylinder group.

\* \* \* \* \*